UNITED STATES PATENT OFFICE.

CLARENCE H. McALPINE, OF HILLSBOROUGH, NEW HAMPSHIRE.

FIRE AND WATER PROOF PAINT.

SPECIFICATION forming part of Letters Patent No. 467,106, dated January 12, 1892.

Application filed September 23, 1891. Serial No. 406,609. (No specimens.)

*To all whom it may concern:*

Be it known that I, CLARENCE H. MCALPINE, a citizen of the United States, residing at Hillsborough, in the county of Hillsborough and State of New Hampshire, have invented a new and Improved Fire and Water Proof Paint, of which the following is a specification.

The object of my invention is to produce a paint which may be used for coating wood, iron, or tin, which paint shall be fire and water proof.

My improved paint is composed of the following ingredients mixed in substantially the following proportions: coal-tar, fifty gallons; kerosene-oil, four gallons; linseed-oil, ten gallons; fish-oil, ten gallons; japan, two gallons; liquid rubber, two gallons; nitric acid, four ounces; slate-dust, twenty pounds; glue, four pounds; sal-soda, eight pounds; potash, two pounds; crude antimony, two pounds; sodium, four pounds.

The paint is prepared as follows: The coal-tar, kerosene-oil, fish-oil, linseed-oil, japan, and rubber are thoroughly mixed. The sal-soda is dissolved in four gallons of boiling water, the solution added to the previous mixture, and the whole thoroughly shaken. The slate-dust, glue, potash, and sodium are then added. The crude antimony is then treated with the nitric acid, the product added to the mixture, and the whole thoroughly mixed.

I do not wish to limit myself to the exact proportions and ingredients named, as it is obvious that changes may be made without departing from the spirit of my invention. For instance, the glue may be omitted, one kind of oil may be used instead of the three named above, and various similar changes made.

Having fully described my invention, what I desire to claim, and secure by Letters Patent, is—

The herein-described paint, composed of coal-tar, oil, japan, liquid rubber, nitric acid, slate-dust, sal-soda, potash, antimony, and sodium, substantially as described.

CLARENCE H. McALPINE.

Witnesses:
GILMAN A. GOULD,
FRANK H. PIERCE.